May 7, 1968     T. M. GRUBBS     3,381,527

TENSION MEASUREMENT DEVICE

Filed Nov. 18, 1965     2 Sheets-Sheet 1

Thomas M. Grubbs
INVENTOR.

BY
Bernard A. Reiter
ATTORNEYS

May 7, 1968
T. M. GRUBBS
3,381,527
TENSION MEASUREMENT DEVICE
Filed Nov. 18, 1965
2 Sheets-Sheet 2
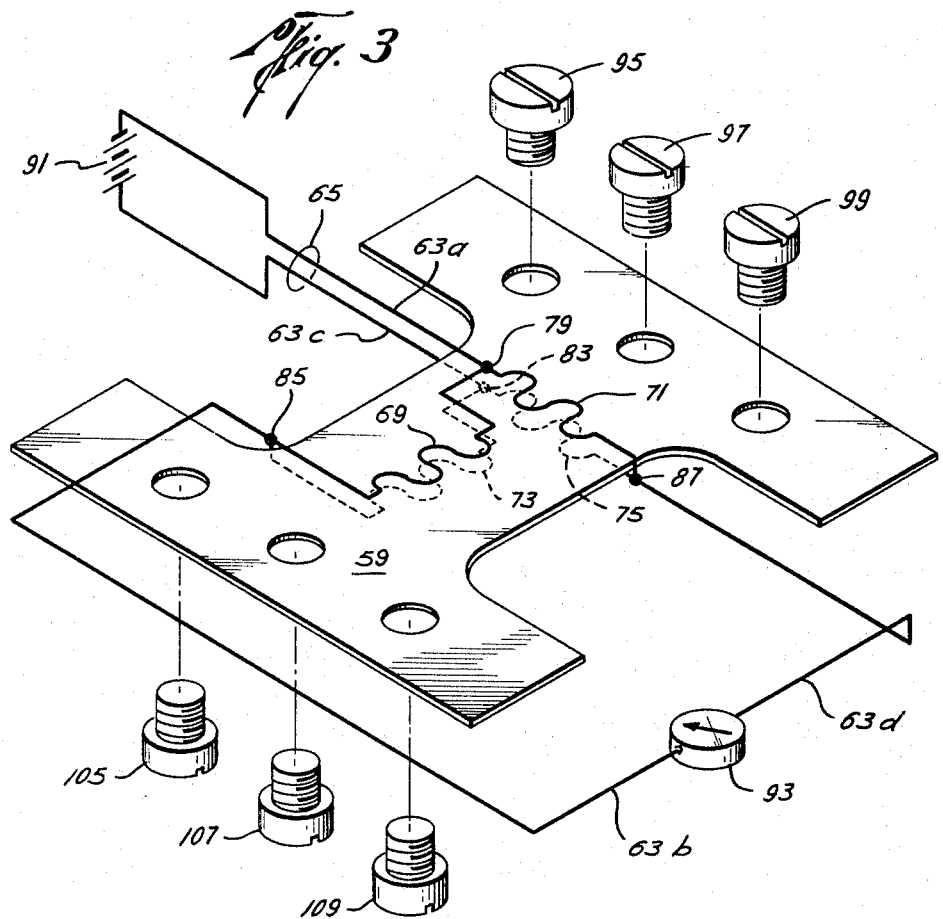
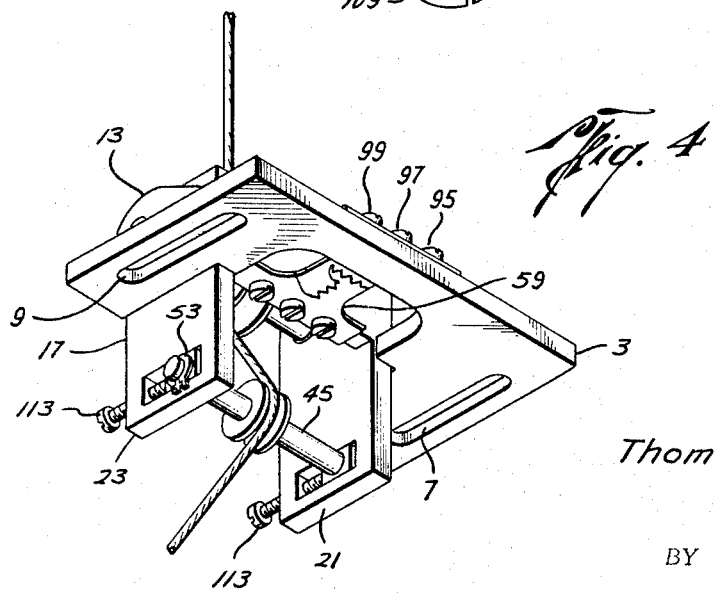
Thomas M. Grubbs
INVENTOR.
BY Bernard A. Reiter
ATTORNEYS

United States Patent Office 3,381,527
Patented May 7, 1968

3,381,527
TENSION MEASUREMENT DEVICE
Thomas M. Grubbs, Houston, Tex., assignor to the United States of America as represented by the Administrator of the National Aeronautics and Space Administration
Filed Nov. 18, 1965, Ser. No. 508,601
3 Claims. (Cl. 73—144)

ABSTRACT OF THE DISCLOSURE

An apparatus for measuring a load on a cable under either static or dynamic conditions, comprising a pivotally mounted, dual pulley, line bearing structure restrained against movement by an electrical tension strap. The load on a cable pasing over the pulleys attempts to pivot the structure against the restraint of the tension strap. Strain gauges on the strap provide a rear-out of the load on the cable.

---

The invention described herein may be manufactured and used by or for the Government of the United States of America for governmental purposes without the payment of any royalties thereon or therefor.

The present invention pertains to load measuring devices and more particularly to an improved mechanism for measuring the tension in a cable or line when it is either in a static or dynamic state.

In numerous and varied types of apparatus such as well shooting and hoisting equipment, cargo parachutes, and belt driven machinery it is often necessary to measure the tension on various cables, lines, or the like so as to monitor a particular operation or maintain it within prescribed limits of safety. This necessity to measure the loading occurs not only when the cable or line is in a static state but when it is moving at rapid and varying speeds. Although static and dynamic line-load measuring devices are known to the prior art, they are generally characterized by their inability to continuously and accurately monitor the line when it is loaded. The subject invention is therefore directed to an improved device for this purpose. It incorporates a pivotally mounted dual pulley, line-bearing structure which is restrained against movement by an electrical tension strap. The pulleys are capable of both rotational and translational motion on their axes. Such a structure greatly simplifies the conventional tri-pulley construction with its several electrical leads. This simplified arrangement not only results in economy of construction but has been found to produce measuring accuracy to within 2% of the actual load, this being possible when the line being measured is in either a static, dynamic, or alternating static-dynamic state of operation. These and numerous other features and advantages of the invention will become more evident to the reader upon examination of the following specification, claims, and drawings, wherein like numerals denote like parts in the several views, and wherein:

FIG. 3 is an enlarged schematic view of the tension strap, strain gauges, and associated circuitry; and FIG. 4 is a modification of the tension measuring device of FIGS. 1 and 2.

Figure 1:
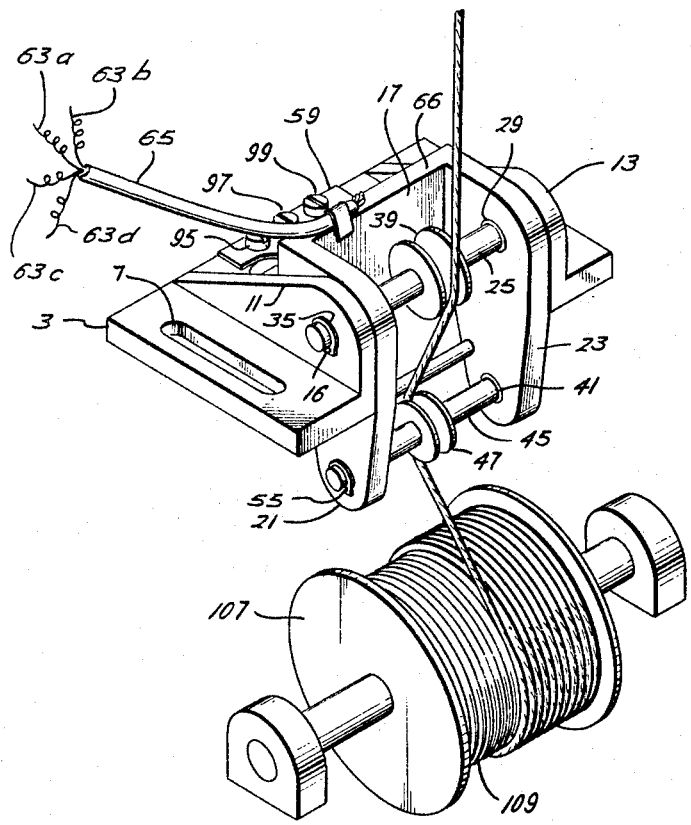
FIG. 1 is an upper-front perspective view of the measuring device of the invention.
Figure 2:
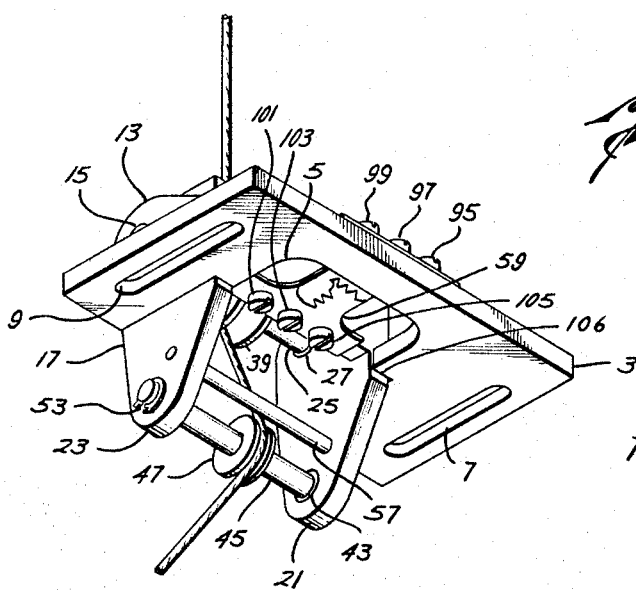
FIG. 2 is a lower-rear perspective view showing the device of FIG. 1.

With reference to FIGS. 1 and 2 of the drawings, the measuring device is seen to constitute a base member 3 having a centrally located, generally U-shaped cutout 5, and a pair of integral perpendicularly disposed wing sections 11, 13 on each side of central cutout 5. An elongated bolt hole 7, 9 is provided in the base exterior to each wing section for adjustable connection to a support member (not shown). A circular hole 15, 16 is provided in the upper portion of each wing section, the axis of each of said holes being perpendicularly disposed to the plane of its respective section.

Pivotally connected to base member 3 is a yoke 17 which supports the pulleys 39, 47 that transmit cable forces to the attached tension strap described hereinafter. To prevent inaccuracy in the transmission of these forces because of friction, it is required that the wings 21, 23 of the pivotally connected yoke not be in abutting contact with base wing sections 11, 13 after the base and yoke are assembled. A gap of about .005 inch between each pair of adjacent wings is sufficient to prevent these frictional force losses. Connection of the yoke is accomplished by means of pulley shaft 25 which extends through circular holes 27 (not shown), and 29 in each yoke wings and also through aligned holes 15, 16 in the base wings. A press fit bearing may be set within each of holes 27, 29 of the yoke wings so as to eliminate as much friction as possible. After the shaft is inserted in wing holes 27, 29 it is affixed by means of snap washers 35 which engage in circular recesses at each end exteriorly of the base wings. The shaft is then lubricated with an appropriate grease or grease-like substance so as to permit free translational and rotational movement of the pulley therealong.

At the lower end of each yoke wing 21, 23 another hole 41, 43 is provided. The lower pulley shaft 45 having lower pulley 47 disposed thereon is installed in these holes. A circumferential recess is provided at each end of the shaft exteriorly of the surface of each yoke wing and receives respective snap washers 53, 55 in the same manner as described above. A guide bar 57 may be affixed to the yoke at an appropriate radius from the lower pulley shaft 45 in order to keep the line passing over the pulley from jumping out of the recessed channel therein during a slack line condition.

The tension in the line which passes over the dual pulley arrangement is measured by means of tension strap 59 and associated strain gauges. Although numerous materials may be used for this strap, depending upon the contemplated loads and application, a .009 inch thick 17–4PH stainless steel, heat treated to 120,000 p.s.i. tensile yield will accomplish most purposes. As best shown in enlarged form in FIG. 3, opposed strain gauges 69, 71 are disposed adjacent each other on the upper surface of the strap and two other opposed gauges 73, 75 are disposed in the same manner on the lower surface. The gauges 69, 73 are matched pairs to compensate for bending of the surface as are gauges 71 and 75, the latter pair however being perpendicular to the former pair to compensate for latitudinal shrinkage due to the well-known Poisson Effect.

Extending down the back wall of yoke 17 is the strain gauge lead wire 65 (see FIGS. 1 and 3) having conductors 63a–d therein. The lead wire may be connected to the yoke by appropriate contact cement such as Eastman 9–10. Connection of the conductors to gauges 69, 71, 73, and 75 is accomplished by soldering the upper wire 63a at junction 79 between gauges 69, 71 while lower wire 63c is soldered at junction 83 between lower gauges 73, 75. The upper and lower gauges 69, 73 are in turn soldered at junction 85 as are gauges 71, 75 at junction 87. The power from source 91 is carried by the lead 65 in conductors 63a and 63c to junctions 79, 83 respectively on each side of the tension plate while a millivolt meter 93, calibrated into the desired load readings, such as pounds force, is connected to the conductors 63b and 63d between junctions 85, 87. Although the strain gauge and circuit arrangement described may be recognized as that of a conventional Wheatstone bridge it is apparent that other strain gauge arrangements and associated circuitry may be applied to the tension strap depending on the magnitude of expected loads, desired accuracy of load reading, and other such factors familiar to those in the art.

As shown in FIG. 1, the tension strap is attached to the base by a series of three screws 95, 97, 99 which fit into tapped apertures at the rear of the base. The front end of the strap is affixed to the back of yoke 17 in an identical manner by screws 101, 103, 105 (FIG. 2). There should be noted indented portions 106 on each side of the U-cutout of the base into which the yoke fits. These indents serve as abutments to prevent accidental handling pressure on the yoke from compressing the tension strap and thereby bending it. Conversely, it is necessary that the yoke not be in contacting relationship with the abutments or abutment corners since the resulting friction would adversely affect measuring accuracy. A separation of .005 inch here also is considered sufficient for this purpose.

In operation the measurer is mounted adjacent the take-up drum 107 of a common electric winch, the drum being preferably of the type having recessed line receiving crevices 109 for preventing line overlay. In this arrangement the drum acts as the third pulley which is present in conventional measuring devices. The cable or line is threaded interiorly of pulley 47 and exteriorly of pulley 39, as shown in the drawings. It thus leaves the drum and wraps partially on each of the two pulleys so that the angle of incidence and departure on pulley 47 remains constant. In this manner a counterclockwise force is constantly exerted about the yoke axis or shaft 25. The movement of the yoke is, of course, imperceptible to the eye, since it is in effect anchored to the base by the tension strap. The counterclockwise force on the yoke, however, exerts a tensile force on strap 59 causing it to enter a tension state. As is well-known in the art, the tensed condition of the strap reduces the cross sectional area of the attached strain gauges in proportion to the force exerted. The changing resistance of the gauges is then read, as previously explained, on a millivolt meter which has been precalibrated with known line loads.

It will be recognized that since the pulleys are free to translate along their rotational axis in accordance with the position on the drum of the unwinding line, the forces exerted on the lower pulley are maintained in a direction substantially perpendicular to the pulley axis thereby minimizing frictional force losses and subsequent inaccurate readings. It is also noted that the angle of incidence and departure on the lower pulley is a critical factor in designing not only the base, yoke, and tension strap but also the gauges and associated circuitry. It is therefore contemplated that the lower pulley position may be adjustable so as to vary this angle to satisfy the operating loads and characteristics anticipated. Although numerous modifications of the subject device may be contrived for this purpose there is shown in FIG. 4 an exemplary construction identical in all features to that described above except for the provision of an adjustable lower pulley axis. Thus by mere adjustment of lock bolts 113, the axis 45 may be moved to accomplish the purpose noted.

In view of the teachings hereinabove, it is apparent that the measuring device may be altered not only in size, shape, and materials but also as to the relative location of the pulleys to each other. Likewise varying arrangements for the strain gauges may be made. Thus, all such improvements, variations, and modifications are considered to lie within the province and scope of the instant invention and it may be therefore practiced otherwise than as specifically explained.

What is claimed and desired to be secured by Letters Patent is:

1. An apparatus for measuring tension in a line and for providing gauge readings directly proportional to the line tension comprising:

a base member;

line bearing means movably mounted on said base member, comprising a yoke shaped member mounted on pivot like means to said base;

a strap means having first and second ends;

means attaching each said ends respectively to said base member and said line bearing means to restrain movement of the letter;

electrical strain gauge means affixed to the surface of said strap means so that the application of force to said line bearing means varies the resistance of the strain gauges;

an upper and lower pulley rotatably mounted and translationally movable about axles affixed to said yoke shaped member, said lower pulley adapted to receive a line about a portion of its surface proximate said strap means and said upper pulley adapted to receive the line about a portion of its surface remote from said strap means; and said strap means affixed to said yoke shaped member at a point intermediate said upper and lower pulleys so that radially directed forces exerted by the line at the lower pulley axis causes the strap to enter a state of tension.

2. An apparatus for measuring tension in a line and for providing gauge readings directly proportional to the line tension comprising:

a base member;

line bearing means pivotally mounted on said base member;

a strap means having first and second ends;

means attaching each said ends respectively to said base member and said line bearing means to restrain movement of the latter;

electrical strain gauge means affixed to the surface of said strap means so that the application of force to said line bearing means varies the resistance of the strain gauges;

means on said base member for preventing movement of said line bearing means toward said strap means;

a yoke included in said line bearing means having an upper and lower pulley axle affixed therein, said upper pulley axle affixed to said base to thereby provide a pivotal mount for said yoke;

each said upper and lower pulley axle supporting a pulley which is free for rotational and translational movement thereon; and said strap means affixed to said yoke intermediate said upper and lower pulley axles, the pulley on said upper axle adapted to receive a line about a portion of its surface remote from said strap means, and said pulley on said lower pulley axle adapted to receive a line on a portion of its surface proximate said strap means so that load on the line exerts tensile force on said strap means.

3. An apparatus for measuring tension in a line and for providing gauge readings directly proportional to the line tension comprising:

a base member;

line bearing means pivotally mounted on said base member;

a strap means having first and second ends;

means attaching each said ends respectively to said base member and said line bearing means to restrain movement of the latter;

electrical strain gauge means affixed to the surface of said strap means so that the application of force to said line bearing means varies the resistance of the strain gauges;

means on said base member for preventing movement of said line bearing means toward said strap means;

a yoke included in said line bearing means having an upper pulley axle and lower pulley axle affixed therein, said upper pulley axle extending to and mounted on said base to provide a pivot for said yoke, said lower axle adjustably movable with respect to the upper axle;

a pulley for receiving a line rotatably and translationally disposed on each said upper and lower axles; and said strap means affixed to said yoke intermediate said upper and lower pulley axles, the pulley on said upper axle adapted to receive a line about a portion of its surface remote from said strap means, and said pulley on said lower pulley axle adapted to receive a line on a portion of its surface proximate said strap means so that a load on the line exerts tensile force on said strap means.

References Cited
UNITED STATES PATENTS

| | | | |
|---|---|---|---|
| 1,694,509 | 12/1928 | Klemperer | 73—144 |
| 2,131,868 | 10/1938 | Bolton et al. | 73—144 |
| 2,513,295 | 7/1950 | Eisenberg | 73—141 |

RICHARD C. QUEISSER, *Primary Examiner.*

JAMES GILL, *Examiner.*

JAMES H. WILLIAMSON, *Assistant Examiner.*